United States Patent [19]

Krause

[11] Patent Number: 5,535,992
[45] Date of Patent: Jul. 16, 1996

[54] APPARATUS AND METHOD FOR ACIDIC LEACHING OF LATERITIC ORES

[75] Inventor: Eberhard Krause, Oakville, Canada

[73] Assignee: Goro Nickel S.A., Noumea, New Caledonia

[21] Appl. No.: 399,892

[22] Filed: Mar. 7, 1995

[51] Int. Cl.$^6$ ........................................................ C21B 7/00
[52] U.S. Cl. ........................... 266/171; 266/168; 423/111
[58] Field of Search ...................................... 266/168, 169, 266/170, 171; 423/111, 29, 27

[56] References Cited

U.S. PATENT DOCUMENTS

| | | | |
|---|---|---|---|
| 826,407 | 7/1906 | Davis | 202/172 |
| 1,940,118 | 12/1933 | Cramer | 23/59 |
| 2,136,372 | 11/1938 | Burnett | 266/12 |
| 3,809,549 | 5/1974 | Opratko et al. | 75/101 R |
| 3,917,519 | 11/1975 | Fisher et al. | 423/140 |
| 4,098,870 | 7/1978 | Fekete et al. | 423/124 |
| 4,374,101 | 2/1983 | Lussiez et al. | 423/150 |
| 4,399,109 | 8/1983 | Ller et al. | 423/141 |
| 4,415,542 | 11/1983 | Queneau et al. | 423/141 |
| 4,541,868 | 9/1985 | Lowenhaupt et al. | 75/101 R |
| 4,541,994 | 9/1985 | Lowenhaupt et al. | 423/150 |
| 4,547,348 | 10/1985 | Lussiez et al. | 423/150 |
| 4,548,794 | 10/1985 | Lowenhaupt et al. | 423/123 |
| 4,571,262 | 2/1986 | Kerfoot et al. | 75/101 R |
| 4,627,900 | 12/1986 | Sherwood et al. | 204/147 |
| 4,861,371 | 8/1989 | Lowenhaupt et al. | 75/101 R |
| 5,236,676 | 8/1993 | Touro et al. | 423/29 |

*Primary Examiner*—Scott Kastler
*Attorney, Agent, or Firm*—Blake T. Biederman; Edward A. Steen

[57] ABSTRACT

The invention provides an autoclave configuration for pressure leaching lateritic ores at elevated temperatures. The autoclave configuration includes at least one primary autoclave. The primary autoclave includes a slurry inlet port for receiving slurries of lateritic ore from a lateritic slurry supply, an acid inlet port for receiving leaching acids, an agitation means for agitating the slurries of lateritic ore, and an outlet port for removing partially leached slurries of lateritic ore. A multi-compartment autoclave follows the primary autoclave. The multi-compartment autoclave is divided into at least two chambers connected in series. The chambers contain a means for agitating the partially leached slurries and divider walls for separating the chambers. An inlet port is connected to the first of the chambers for receipt of the partially leached slurries. An outlet port is connected to the last of the series of chambers for removal of the finally leached slurries. A bypass conduit is connected to the lateritic slurry supply and the multi-compartment autoclave. The bypass conduit is for periodically isolating the primary autoclave for removal of scale while leaching lateritic ore in the multi-compartment autoclave.

3 Claims, 2 Drawing Sheets

5,535,992

APPARATUS AND METHOD FOR ACIDIC LEACHING OF LATERITIC ORES

FIELD OF THE INVENTION

This invention is related to an apparatus and method for improved autoclave leaching of lateritic ores. In particular, this invention is related to an apparatus and method for continuous acidic pressure leaching of lateritic ores.

BACKGROUND OF THE INVENTION

The most commonly used apparatus for pressure leaching ore is a multi-compartment autoclave. Multi-compartment autoclaves are typically constructed of a single pressure vessel divided into multiple chambers. In the multi-compartment autoclave, a feed slurry is gravity fed from chamber to chamber to progressively leach metal values from the ore. The lixiviant for lateritic ores is typically sulfuric acid, which is added to the first chamber and possibly to additional chambers of the autoclave. A schematic diagram of a multicompartment autoclave used for pressure leaching of lateritic ores is provided in U.S. Pat. No. 4,374,101. The multi-compartment autoclave provides the advantages of efficient use of space and relatively low cost. However, when a single chamber of a multi-compartment autoclave requires maintenance, the entire autoclave must be shut down for service. This interruption of pressure leaching significantly limits leach liquor production from lateritic ores.

Alternative plant designs have relied upon a cascade of single compartment autoclaves. The single compartment autoclave design is more flexible to operation upsets. For example, provided the single autoclaves have the required vane and piping configuration, continued operation of functional autoclaves is possible while servicing an autoclave. However, the disadvantages of the single compartment autoclave design include increased cost and inefficient use of plant space.

The acidic leaching of lateritic ores with sulfuric acid requires temperatures of about 240° C. or higher to proceed sufficiently rapidly to be of industrial interest. Unfortunately, leaching is accompanied by the formation of scale under these conditions. The scale consists mainly of hematite ($Fe_2O_3$), hydronium alunite ($H_3OAl_3(SO_4)_2(OH)_6$) and basic iron sulfate ($FeSO_4OH$). The scale covers all surfaces exposed to the leach slurry, i.e. the autoclave walls and internals.

Scale formation is generally the result of super-saturation with respect to specific dissolved species. Super-saturation may, for example, be caused by rapid temperature changes and when the precipitation reaction is kinetically slow. In the case of laterite ore leaching, iron and aluminum are present in the ore mainly as goethite ($FeOOH$) and gibbsite ($Al(OH)_3$), respectively. The iron and aluminum values originally contained in the ore dissolve due to reaction with sulfuric acid, and re-precipitate mainly in the form of hematite ($Fe_2O_3$) and hydronium alunite ($H_3OAl_3(SO_4)_2(OH)_6$), respectively. Essentially all of the precipitates report to the leach residue. However, since the precipitation reaction is relatively slow with respect to the dissolution reaction, this leads to super-saturation which results in scale formation.

Most of the scale forms in the compartments to which acid is added, i.e. where the iron and aluminum concentrations are relatively high. If the acid is added only to the first chamber, then most of the total scale found in a multi-compartment autoclave will be produced in the first compartment. When the rate of scale formation in the first compartment is rapid, the entire multi-compartment autoclave must be shut down frequently for descaling. In order to even out the rate of scale formation in a multi-compartment autoclave used for the acidic leaching of lateritic ores, Fekete et al., in U.S. Pat. No. 4,098,870, disclose incremental acid addition to several compartments. The acid is added incrementally in order to limit the iron and aluminum concentrations to less than about 4 grams per liter. While this process effectively reduces the rate of scale formation in the first compartment of a multi-compartment autoclave, it does require an increased retention time for adequately leaching the contained nickel and cobalt values.

Several methods have been proposed over the years to control scale formation in autoclaves used to leach lateritic ores. Opratko et al., in U.S. Pat. No. 3,809,549, disclose pressure leaching at a temperature between 200° and 260° C. with pyrite and oxygen for the "in situ" generation of sulfuric acid. Iler et al., in U.S. Pat. No. 4,399,109, disclose a method of recycling slurry to an intermediate temperature flash stage to limit silica scale formation. In another approach for controlling the scale formation during acidic leaching of lateritic ores in an autoclave, Queneau et al., in U.S. Pat. No. 4,415,542, disclose the leaching of lateritic ores with sufficiently high magnesium contents (3% to 30% by weight) to inhibit the formation of hematite/alunite scale while favoring the formation of a scale rich in magnesium sulfate which is water soluble. Finally, Sherwood et al., in U.S. Pat. No. 4,627,900, disclose a method of minimizing scale formation by periodically reversing current between an autoclave and an electrode submerged within the autoclave. As far as known, none of the above methods has completely eliminated the requirement for periodic scale removal from lateritic autoclaves.

Typically, the scale may be removed by shutting down an autoclave and dissolving the scale with a strong acid or physically chipping away pieces of scale. For example, Lussiez et al., in U.S. Pat. No. 4,374,101 ('101), disclose lowering the autoclave temperature to about 200° C. and dissolving the scale deposits with about 30 to 40 g/l $H_2SO_4$. This procedure, requiring about 60 hours for a 93 percent removal of hematite-alunite scale, is quicker than the five to seven day physical removal process presently used at the Moa Bay operation in Holquin Province, Cuba. The problem with the process of the '101 patent is that it also requires the autoclave to be shut down for several days during cleaning operations.

It is an object of this invention to provide a pressure leaching autoclave configuration for lateritic ore that may essentially be operated on a continuous basis, i.e. with which less frequent stoppages are required for descaling.

It is a further object of this invention to provide a method for operating a multi-compartment autoclave on a continuous basis for pressure leaching of lateritic ores.

It is a further object of the invention to provide an autoclave configuration that allows flexible operating conditions for pressure leaching of lateritic ores.

It is a further object of this invention to provide an autoclave that maintains the flexibility of single-compartment autoclaves without the loss of plant floor space and increased costs associated with single-compartment autoclaves.

SUMMARY OF THE INVENTION

The invention provides an autoclave configuration for pressure leaching lateritic ores at elevated temperatures. The autoclave configuration includes at least one primary autoclave. The primary autoclave includes a slurry inlet port for receiving slurries of lateritic ore from a lateritic slurry supply, an acid inlet port for receiving leaching acids, an agitation means for agitating the slurries of lateritic ore, and an outlet port for removing partially leached slurries of lateritic ore. A multi-compartment autoclave follows the primary autoclave. The multi-compartment autoclave is divided into at least two chambers connected in series. The chambers contain a means for agitating the partially leached slurries and divider walls for separating the chambers. An inlet port is connected to the first of the chambers for receipt of the partially leached slurries. An outlet port is connected to the last of the series of chambers for removal of the finally leached slurries. A bypass conduit is connected to the lateritic slurry supply and the multi-compartment autoclave. The bypass conduit is for periodically isolating the primary autoclave for removal of scale while leaching lateritic ore in the multi-compartment autoclave.

DESCRIPTION OF PREFERRED EMBODIMENT

The invention provides an apparatus and method for continuously leaching lateritic ores. In the method of the invention, at least one primary autoclave is used to leach lateritic ore at elevated temperatures and pressures. Laterite ore, for purposes of this specification, is defined as nickel-containing oxides or silicates that have been formed by the weathering of rocks. For purposes of this specification, elevated temperature is defined by temperatures above room temperature. Elevated pressure, for purposes of this specification is defined by pressures above atmospheric pressure. Typically, laterites are leached with sulfuric acid at a temperature from 240° to 300° C. It has been discovered that having at least 70 percent of all scale precipitate in the autoclave where sulfuric acid is added provides an opportunity to greatly reduce the frequency of autoclave shutdowns. The design of the invention allows for cleaning of a primary autoclave while simultaneously operating a multi-compartment autoclave or while simultaneously operating a multi-compartment autoclave in combination with another primary autoclave.

Figure 1:
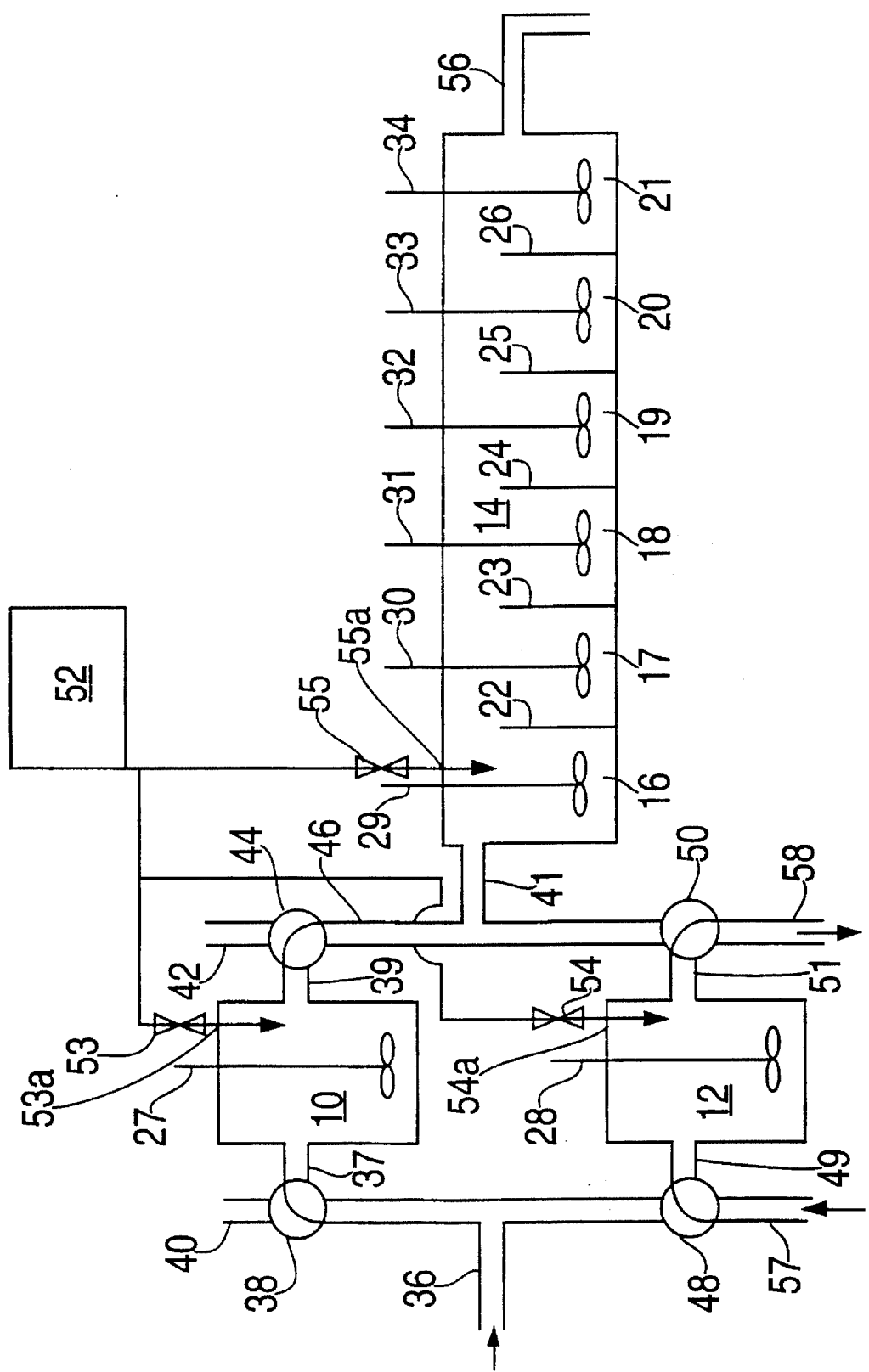
FIG. 1 is a schematic view of an autoclave configuration having two primary autoclaves followed by a multi-compartment autoclave.

Referring to FIG. 1, primary autoclaves 10 and 12 are alternatively used to feed partially leached slurry of lateritic ore from a lateritic slurry supply to multi-compartment autoclave 14. Multi-compartment autoclave 14 is divided into chambers 16 to 21. The chambers are separated by divider walls 22 to 26. During operation, a slurry of partially leached lateritic ore is progressively leached in leach chambers 16 to 21. The slurry is gravity fed over dividers 22 to 26 to optimize leaching of metal values from the lateritic ore. During leaching operations, autoclaves 10, 12 and 14 are agitated with agitation means such as stirrers 27 to 34.

Stirrers 27 to 34 agitate the autoclaves to prevent the slurry of lateritic ore from settling and adhering to the autoclaves. Alternatively, autoclaves may be agitated with pressurized steam. Autoclaves 10, 12 and 14 are advantageously heated. Most advantageously, autoclaves 10, 12 and 14 are heated with pressurized steam. Advantageously, primary autoclaves 10 and 12 have equal or greater volumes than chambers 16 to 21. The increased volume of the primary autoclaves increases residence time for increased leaching and decreases the viscosity of the slurry. The decreased viscosity of the slurry reduces scaling problems. Optionally, partially leached slurry is transferred back to primary autoclaves 10 and 12 from one or more of the chambers of the multi-compartment autoclave to further reduce viscosity. Additionally, divider plate 22 may optionally be removed to provide a larger first compartment of the multi-compartment autoclave 14.

FIG. 1 schematically illustrates flow for leaching conditions with primary autoclave 10 in combination with multi-compartment autoclave 14, while primary autoclave 12 is independently cleaned with an acid solution. In this configuration, primary autoclave 10 is acting as a bypass conduit. For purposes of the invention, bypass conduit is defined as any conduit that allows continued feed to a multi-compartment autoclave while a primary autoclave is shut down for cleaning. During leaching operations with primary autoclave 10, a preheated aqueous slurry of lateritic ore is fed from a source or supply of lateritic slurry through inlet conduit 36, valve 38 and inlet port 37 into primary autoclave 10 for acid leaching at elevated temperatures and pressures. During the leaching operation, acid cleaner conduit 40 and acid cleaner exit conduit 42 are isolated from primary autoclave 10 with valves 38 and 44. The partially leached lateritic ore slurry then travels through outlet port 39, through valve 44, transfer conduit 46 and inlet port 41 to multi-compartment autoclave 14 for additional acid leaching.

During operation of multi-compartment autoclave 14, valves 48 and 50 are turned to prevent partially leached slurry from flowing into primary autoclave 12. Sulfuric acid or another suitable acid from tank 52 is fed through valves 53 and 55, through acid inlet ports 53a and 55a, respectively, to leach the lateritic ore. (Similarly, acid inlet port 54a is used to introduce acid when multi-compartment autoclave 12 is leaching). In multi-compartment autoclave 14, the partially leached lateritic slurry is progressively leached in chambers 16 to 21 and ultimately exits outlet port 56 and passes through a suitable pressure let-down device or system (not illustrated). Since the vast majority of scale forms in primary autoclaves 10 or 12, multi-compartment autoclave 14 may be operated several months without scale buildup problems.

Primary autoclave 12 is illustrated being cleaned during the continued leaching operation of autoclaves 10 and 14. Dilute acid is advantageously fed through acid cleaner conduit 57, through valve 48, and inlet port 49 into primary autoclave 12. During acid cleaning, agitator 28 is advantageously stirred to facilitate dissolution of the scale. An acid solution containing dissolved scale then exits through outlet port 51, valve 50 and acid cleaner exit conduit 58 to remove the dissolved scale. To alternate leaching and cleaning operations between primary autoclaves 10 and 12, the bias of valves 38, 44, 48 and 50 is reversed. With the autoclave configuration of FIG. 1, autoclaves 10 and 12 may be operated in parallel for extended periods of time prior to alternately cleaning primary autoclaves 10 and 12.

Figure 2:
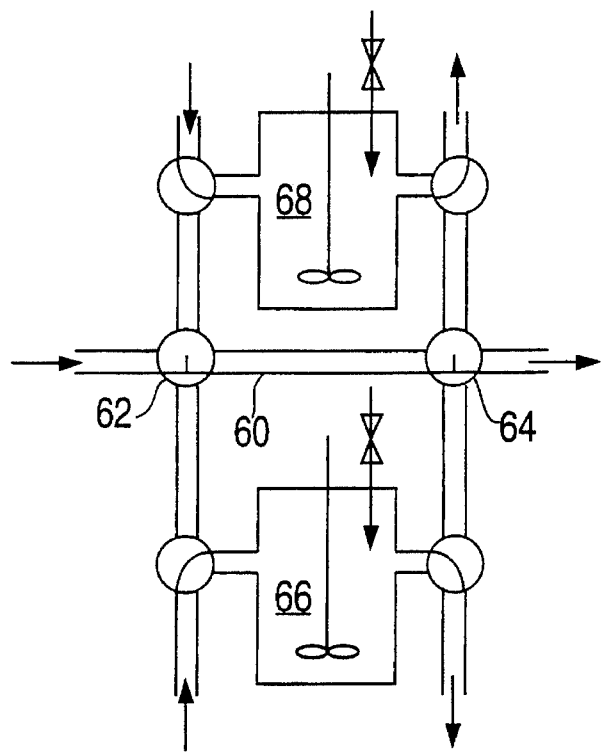
FIG. 2 is a schematic view of an autoclave configuration having two primary autoclaves and a separate bypass conduit, (the multi-compartment autoclave is not illustrated)

Referring to FIG. 2, the design of FIG. 1 may alternatively be modified to include bypass conduit 60 and four-way valves 62 and 64. For purposes of this specification multiple-way valves may consist of one valve or more than one valve acting in combination. Which the design of FIG. 2, primary autoclaves 66 and 68 may be cleaned simultaneously while lateritic leach solution is fed directly into a multi-compartment autoclave through bypass conduit 60. Valves 62 and 64 (in combination with the three-way valves adjacent to autoclaves 66 and 68) may also be manipulated to operate primary autoclaves 66 and 68 individually or in parallel. Operating primary autoclaves 66 and 68 in parallel allows for doubling of residence time in the primary autoclaves.

Optionally, primary autoclave 68 and its associated hardware may be removed to operate a single primary autoclave prior to a multi-compartment autoclave. When using a single primary autoclave, the bypass conduit 60 is used to maintain constant leaching while primary autoclave 66 is being cleaned.

Figure 3:
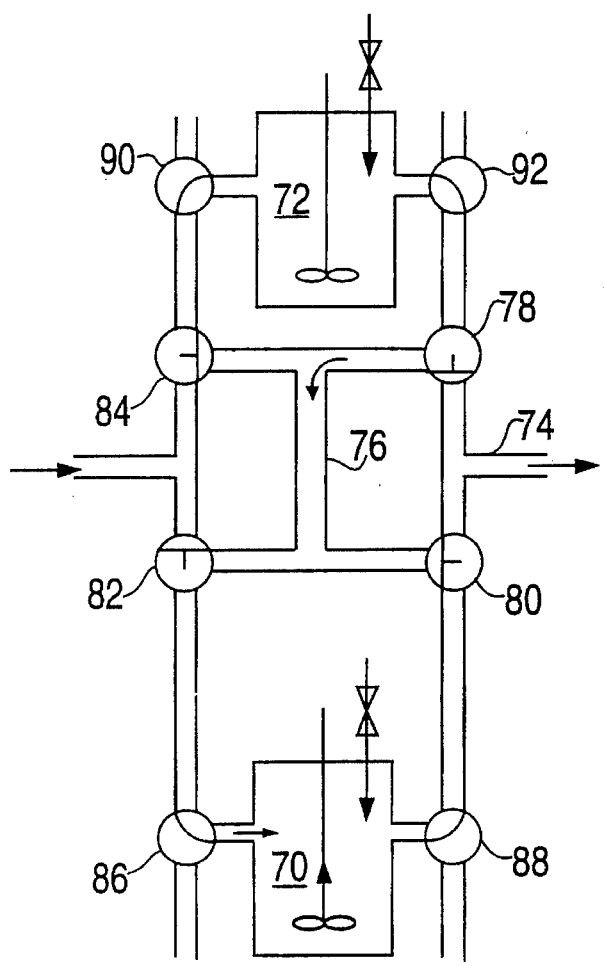
FIG. 3 is a schematic view of an autoclave configuration having two primary autoclaves and an H-shaped bypass conduit, (the multi-compartment autoclave is not illustrated).

Referring to FIG. 3, the design of FIG. 1 may alternatively be modified to operate primary autoclaves 70 and 72 in series to sequentially leach ore. To operate primary autoclaves 70 and 72 in series, H-conduit 76 and three-way valves 78, 80, 82 and 84 are inserted in the design of FIG. 1. FIG. 3 is illustrated with the valves adjusted for operation of primary autoclave 72, then primary autoclave 70 in a series configuration. After sequentially leaching the slurry in primary autoclave 70, the lateritic solution is fed through conduit 74 to a multi-compartment autoclave. Valves 78, 80, 86 and 88 are adjusted to clean primary autoclave 70 while operating primary autoclave 72. Similarly, valves 82, 84, 90 and 92 are adjusted to dean primary autoclave 72 while operating primary autoclave 70. Alternately, H-shaped conduit 76 may be bypassed by adjusting valves 78 and 82 to operate primary autoclaves 70 and 72 in parallel.

Typically, all autoclaves contain vents for removal of gases generated during leaching and acid cleaning operations. The alternating of cleaning and leaching operations provides for the continuous leaching of lateritic ore without the periodic prolonged shutdown associated with other leaching methods and designs. It is recognized that multiple primary autoclaves may be used. However, for cost and plant space efficiency, it is preferred that only two or less primary autoclaves be used.

While a primary autoclave is operating, another autoclave may be cleaned by acid dissolution of the scale, mechanical removal of the scale or a combination of the two cleaning techniques. Advantageously, the scale is removed by acid dissolution. A concentration of at least about 30 g/l $H_2SO_4$ is advantageously used to dissolve the scale. Most advantageously, a concentration of at least 40 g/l $H_2SO_4$ is used to dissolve the scale. Laboratory tests at 50 g/l $H_2SO_4$ have proven effective at dissolving scale. During descaling, the autoclaves are advantageously claimed with sulfuric acid at a temperature of about 150° to 225° C. Most advantageously, the autoclaves are maintained at a temperature between 175° and 200° C. during acid cleaning. If extensive $CO_2$ is generated during acid descaling operations, it may be advantageous to vent the gas from the primary autoclaves during acid descaling.

Advantageously, the autoclaves, conduits and valves are constructed out of titanium or a corrosion resistant alloy to withstand the severely corrosive environments. In addition, corrosion inhibitors are advantageously added to the acid during descaling. Most advantageously:, about 1 g/l Fe—III or Cr—VI is added to protect the autoclaves.

In addition to only operating one primary autoclave at a time, most advantageously, two primary autoclaves are used together for extended periods of time between cleaning cycles. For example, after the primary autoclaves have operated to the point of requiring cleaning, one primary autoclave is placed in the cleaning mode for several hours, while the other primary autoclave continues to operate. After the first primary autoclave has been cleaned, the first primary autoclave returns to leaching, while the other primary autoclave is being cleaned for several hours. After both primary autoclaves have been cleaned, the primary autoclaves return to joint operation for several days or weeks. Operating both autoclaves provides the advantage of increasing the residence time of the lateritic slurry in the primary autoclaves to facilitate effective leaching of metal values.

In summary, the apparatus and method of the invention provide several advantages over the prior art. First, the apparatus allows for continuous leaching of lateritic ores without the requirement to completely shut down production for periodic cleaning of the autoclaves. Second, the invention provides for flexible leaching wherein multiple primary autoclaves may be operated one at a time or in combination together with a multi-compartment autoclave to facilitate leaching. Finally, the apparatus of the invention maintains the flexibility of single compartment autoclaves without the loss of plant space and increased costs associated with single compartment autoclaves.

While in accordance with the provisions of the statute, there is illustrated and described herein specific embodiments of the invention. Those skilled in the art will understand that changes may be made in the form of the invention covered by the claims and the certain features of the invention may sometimes be used to advantage without a corresponding use of the other features.

The embodiments of the invention in which an exclusive property or privilege is claimed are defined as follows:

1. An autoclave configuration for pressure leaching lateritic ores at elevated temperatures comprising:

at least two primary autoclaves, said primary autoclaves containing a slurry inlet port for receiving slurries of lateritic ore from a lateritic slurry supply, an acid inlet port for receiving leaching acids, an agitation means for agitating the slurries of lateritic ore and an outlet port for removing partially leached slurries of lateritic ore, said primary autoclaves being connected in series for sequentially leaching lateritic ore, a multi-compartment autoclave connected to said primary autoclaves, said multi-compartment autoclave being divided into at least two chambers connected in series, said chambers containing an agitator means for agitating the partially leached slurries of lateritic ore and divider walls for separating said chambers, an inlet port connected to the first of said chambers for receipt of the partially leached slurries of lateritic ore and an outlet port connected to the last of said series of chambers for removal of the finally leached slurries of lateritic ore, and a bypass conduit connected to said outlet ports of said primary autoclaves and to said inlet port of said multi-compartment autoclave, said bypass conduit having valves for periodically isolating at least one of said primary autoclaves from said multi-compartment autoclave for allowing removal of scale in said at least one of said primary autoclaves while another of said primary autoclaves is leaching lateritic ore.

2. The autoclave configuration of claim 1 wherein said primary autoclaves are connected by control valves and conduits in a manner that allows leaching of said lateritic ore in said primary autoclaves in series or in parallel, depending upon the bias of said control valves.

3. An autoclave configuration for pressure leaching lateritic ores at elevated temperatures comprising:

at least two primary autoclaves, said primary autoclaves containing a slurry inlet port for receiving slurries of lateritic ore from a lateritic slurry supply, an acid inlet port receiving leaching acids, an agitation means for agitating the slurries of lateritic ore and an outlet port for removing partially leached slurries of lateritic ore, said primary autoclaves being connected in parallel for simultaneously leaching lateritic ore, a multi-compartment autoclave connected to said primary autoclaves, said multi-compartment autoclave being divided into at least two chambers connected in series, said chambers containing an agitator means for agitating the partially leached slurries of lateritic ore and divider walls for separating said chambers, an inlet port connected to the first of said chambers for receipt of the partially leached slurries of lateritic ore and an outlet port connected to the last of said series of chambers for removal of the finally leached slurries of lateritic ore, and a bypass conduit connected to said outlet ports of said primary autoclaves and to said inlet port of said multi-compartment autoclave, said bypass conduit having valves for periodically isolating at least one of said primary autoclaves from said multi-compartment autoclave for allowing removal of scale in said at least one of said primary autoclaves while another of said primary autoclaves is leaching lateritic ore.

* * * * *